No. 661,163. Patented Nov. 6, 1900.
E. T. YOUNG.
PUZZLE.
(Application filed Jan. 29, 1900.)

(No Model.)

Witnesses.
Jac Gadsby
Sam V. Timson

Inventor
Edmund T. Young
By W. Bruce
Atty

THE NORRIS PETERS CO., PHOTO-LITHO., WASHINGTON, D. C.

UNITED STATES PATENT OFFICE.

EDMUND THOMAS YOUNG, OF HAMILTON, CANADA.

PUZZLE.

SPECIFICATION forming part of Letters Patent No. 661,163, dated November 6, 1900.

Application filed January 29, 1900. Serial No. 3,165. (No model.)

*To all whom it may concern:*

Be it known that I, EDMUND THOMAS YOUNG, a citizen of the Dominion of Canada, residing at the city of Hamilton, in the county of Wentworth, in the Province of Ontario, Canada, have invented a new and useful Puzzle, to be called or known as "Quidnunc;" and I do hereby declare that the following is a full, clear, and exact description of the same.

The invention consists in a rectangular box with a mirror set up obliquely at one end and the top covered in about seven-eighths with ground glass, leaving an open space at one end where the mirror is affixed at such an angle that the interior view of the box may be had by the operator holding the box before him and looking at the mirror.

The interior of the box has a series of low partitions about a third of the height of the box placed at different angles, leaving runways or avenues between them. Balls or marbles of the proper size are dropped into the box at the open or mirror end and the box so held by the operator as to cause two or more of the balls or marbles to pass down the runways and around the obstructions by looking at the mirror and balancing the box in such a manner as to cause the balls to go out together at an exit-opening at the rear end of the box. I attain this object by the mechanism illustrated in the accompanying drawings, in which—

Figure 1:
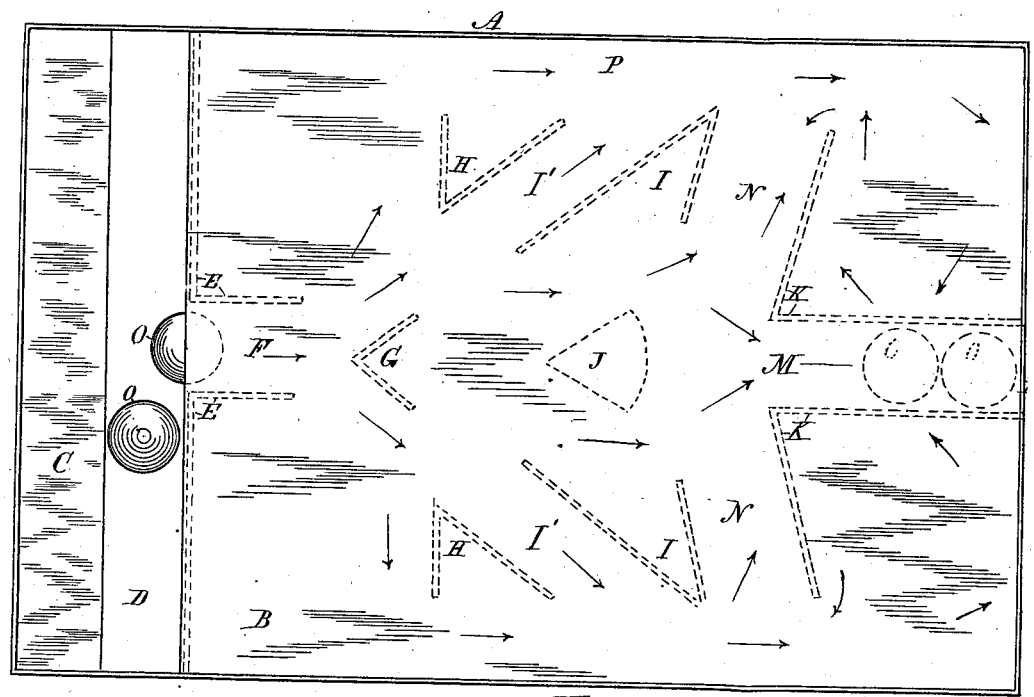
Figure 2:
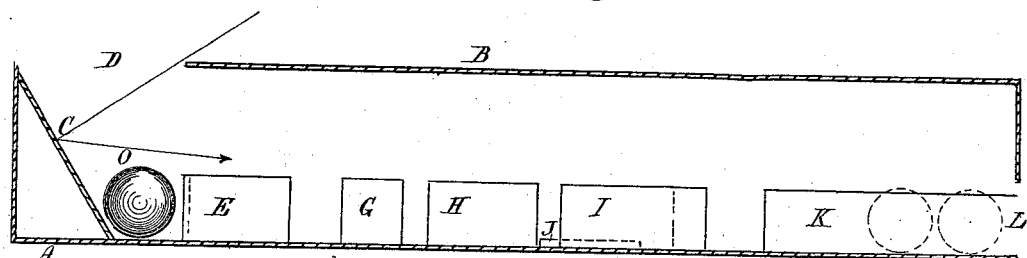
Figure 3:
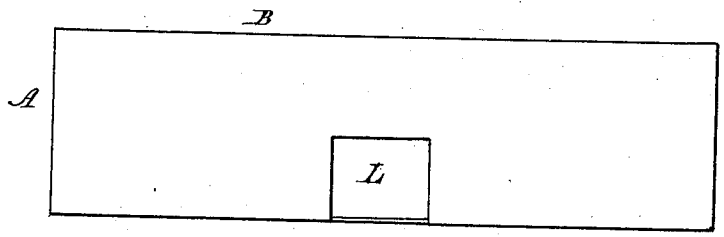

Figure 1 is a top view of the device. Fig. 2 is a side view or section. Fig. 3 is an end view.

Similar letters refer to similar parts throughout the several views.

In the drawings, A represents a rectangular box which may be made of any desired material, but preferably of card or straw board, and which may be covered with any colored paper or ornamentation.

B represents the top, formed of such material as will admit light, as ground glass or the equivalent material, but which cannot be seen through.

C is a mirror the width of the box set at such an angle at the open end of the box that a spectator can see the reflection of the interior of the box when the eye is at the opposite end looking at the mirror.

D is an open space opposite the mirror where the balls or marbles are dropped into the box.

E E are the first two interior partitions, L-shaped, having the two short ends of each pointed in the direction of the rear end of the box and forming a runway F between them, while the long ends of the said partitions form obstructions.

G is the first angular obstruction, with its point toward the center of the runway F. H H are the next slanting partitions and obstructions, formed as shown. I I are the next side partitions, forming a somewhat-acute angle, the lower portion of each running inward, as shown. I' I' are runways between the two long ends of the said partitions I I.

J is a low diamond-shaped pointed obstruction in the center between the partitions I I, as shown.

K K are the lowest partitions on each side of the exit-opening L, and their upper portions are bent inward at an oblique angle, as shown, the space between the straight portions forming an avenue or run M, leading to the exit-opening L, which is a square opening large enough to allow the exit of the balls or marbles employed in the game or puzzle.

N N are runways between the short ends of the partitions I I and the short parts of the partitions K K, and P P are runways between the sides of the box and the partitions.

All the partitions and obstructions are represented by dotted lines, as the cover B cannot be seen through, and it is not intended to be seen through. The partitions are about half an inch high or high enough to prevent the balls from jumping over them and may be secured to the bottom of the box by glue or otherwise, as desired.

In starting to operate the puzzle two or three small balls or marbles, as O O, are placed in the top opening D, opposite the runway F, as shown in Fig. 1, and the object of the puzzle or game is to get the two or three balls or marbles O O to run down through the runways and out together at the exit-opening L by the operator holding the box in his hands and looking at the interior of it by gazing at the mirror C, which shows the interior by reflection, only every object is reversed, the optical illusion of which is very puzzling to an operator, and it is difficult without much practice to succeed in getting two or more balls to run out together one behind the other, as it requires a very steady hand and a correct eye and good judgment.

What I claim as my invention, and desire to secure by Letters Patent, is—

A puzzle operated with balls or marbles, consisting of a box formed with interior partitions, runways and obstructions, having its top partially covered with a semi-opaque covering as ground glass, an opening at one end of the cover, a mirror placed diagonally at the open end of the box, by which the operating-balls and interior can be seen reflected though reversed in the mirror, an inlet-opening for the balls or marbles to enter and an opening in the opposite end for their exit, substantially as and for the purpose specified.

Dated at Hamilton, Ontario, Canada, the 25th day of January, 1900.

EDMUND THOMAS YOUNG.

In presence of—
W. HOLMAN,
WM. BRUCE.